United States Patent
Seto

(10) Patent No.: US 7,206,090 B2
(45) Date of Patent: Apr. 17, 2007

(54) METHOD AND APPARATUS FOR PRINT ORDER PROCESSING AND PROGRAM THEREFOR

(75) Inventor: Satoshi Seto, Kaisei-machi (JP)

(73) Assignee: FujiFilm Corporation, Tokyo (JP)

( * ) Notice: Subject to any disclaimer, the term of this patent is extended or adjusted under 35 U.S.C. 154(b) by 830 days.

(21) Appl. No.: 10/255,067

(22) Filed: Sep. 26, 2002

(65) Prior Publication Data

US 2003/0076532 A1 Apr. 24, 2003

(30) Foreign Application Priority Data

Sep. 27, 2001 (JP) ............................. 2001-298193

(51) Int. Cl.
*G06F 3/12* (2006.01)
*G06F 15/00* (2006.01)

(52) U.S. Cl. ..................................... 358/1.15; 358/1.13

(58) Field of Classification Search ............... 358/1.15, 358/1.16, 1.17, 1.18, 1.1, 1.2, 1.3, 1.4, 1.5, 358/1.6, 1.7, 1.8, 1.9, 1.11, 1.12, 1.13, 1.14, 358/403, 524

See application file for complete search history.

(56) References Cited

U.S. PATENT DOCUMENTS

| | | | | |
|---|---|---|---|---|
| 6,590,671 B1* | 7/2003 | Kinjo | ........................ | 358/1.12 |
| 6,667,810 B1* | 12/2003 | Jeyachandran et al. | .... | 358/1.14 |
| 6,717,686 B1* | 4/2004 | Farros et al. | ................ | 358/1.1 |
| 6,956,666 B2* | 10/2005 | Tanaka | ....................... | 358/1.15 |
| 2003/0016388 A1* | 1/2003 | Christodoulou et al. | ... | 358/1.15 |

* cited by examiner

*Primary Examiner*—Dov Popovici
(74) *Attorney, Agent, or Firm*—Sughrue Mion, PLLC

(57) ABSTRACT

When a print order is placed regarding image data, the deadline of printing processing can be estimated accurately. A user reserves the deadline and places the print order from an order reception server, while using a user terminal. A controller sends to a digital mini-laboratory the image data and order information that were sent from the user terminal so as to complete the printing processing at the reserved time. The digital mini-laboratory carries out the printing processing on the image data, and prints are generated.

20 Claims, 12 Drawing Sheets

| OPTION | SERIAL NUMBER | LABORATORY | DEADLINE | PRINTING CHARGES |
|---|---|---|---|---|
| ○ | 1 | A | 11:00  9/20 (TODAY) | L:  ¥50<br>2L: ¥150 |
| ● | 2 | A | 19:00  9/21 | L:  ¥40<br>2L: ¥120 |
| ○ | 3 | B | 23:00  9/30 | L:  ¥20<br>2L: ¥90 |
| ○ | 4 | C | 10:00  9/20 (TODAY) | L:  ¥80<br>2L: ¥160 |
| ○ | 5 | | | |
| ○ | 6 | | | |

FIG.10

METHOD AND APPARATUS FOR PRINT ORDER PROCESSING AND PROGRAM THEREFOR

BACKGROUND OF THE INVENTION

1. Field of the Invention

The present invention relates to a print order processing method and a print order processing system for carrying out printing processing by receiving a print order regarding image data. The present invention also relates to a program that causes a computer to execute the print order processing method.

2. Description of the Related Art

There have been known digital photograph service systems for carrying out various types of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a printing service system for receiving print orders via a network such as the Internet has also been proposed.

In such a printing service system, a user installs viewer software in his/her personal computer acting as a user terminal, for reproducing image data recorded in a recording medium such as a CD-R or obtained by a digital camera. The user reproduces images represented by the image data, and generates order information describing the content of an order by using an ordering function built-in to the viewer software if the user wishes to place an order. The user can also generate the order information by using a Web browser. The user transfers the order information and the image data representing the images to be printed to an order reception server installed in a service center for receiving the order from the user terminal via the network such as the Internet. The order reception server transfers the order information and the image data to a laboratory server installed in a large-scale laboratory for processing the order. Printed matter such as additional prints, picture postcards, or a photograph album is then generated in the laboratory, based on the order information.

The printed matter generated in the above manner is delivered or mailed to an agency specified by the user at the time of placing the order. The user visits the agency and can receive the printed matter by paying a charge at the agency. The user can designate the agency at the time of placing the order, and a desired store or the like close to the place of residence or employment of the user is generally designated as the agency. The image data and the order information are transferred from the order reception server to the laboratory in collaboration with the agency designated by the user, or to a laboratory that can carry out the processing according to the order information.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, and trimming specification, for example. The order information further includes information regarding the name, the address, the zip code and the phone number of the user, for example.

The printed matter generated in the printing service is delivered or mailed to the agency designated by the user at the time of placing the order, and the user receives the printed matter at the agency, as has been described above. If the agency installs a server for receiving the order information and the image data as well as a printer to print the image data, the agency can function as a laboratory. If the agency has the function of a laboratory, delivery of the printed matter to the agency becomes unnecessary. Therefore, although the agency is small as a laboratory, the time necessary for providing the user with the printed matter can be shortened.

In the printing service system described above, the user can place the print order regarding the image data by using his/her personal computer at any time, regardless of whether it is in the daytime or at night. However, the print order is placed regardless of how busy the laboratory or the agency (hereinafter referred to as the printing service provider) is. Therefore, a large amount of print orders may concentrate in a specific time period or almost no print order may be placed in another time period. For this reason, it is difficult for the printing service provider to accurately estimate when the print order is processed completely, and the printing service provider conventionally notifies a rough deadline such as in 45 minutes or in 3 working days, for example. In the case where a large amount of print orders are concentrated, a printing processing apparatus installed in the printing service provider is in full operation. However, in the time period when almost no order is placed and thus printing processing is hardly carried out, the printing processing apparatus is almost idle. In this manner, the printing processing apparatus is not used efficiently. Since the printing service provider needs to install a system in consideration of the case where a large amount of print orders concentrate, a high-performance laboratory system becomes necessary for processing such orders. Consequently, the system becomes larger and the cost therefor increases.

SUMMARY OF THE INVENTION

The present invention has been conceived based on consideration of the above circumstances. An object of the present invention is therefore to enable accurate estimation of a deadline regarding printed matter.

Another object of the present invention is to efficiently carry out print order processing at a printing service provider.

A first print order processing method of the present invention comprises the steps of receiving image data and order information representing the content of a print order regarding the image data sent from an order terminal that places the print order, and obtaining printed matter by carrying out printing processing on the image data by using printing processing means according to the order information. The first print order processing method further comprises the steps of:

receiving a reservation of a deadline regarding the printed matter from the order terminal; and controlling the printing processing means so as to complete the printing processing at the reserved deadline, regarding the print order placed by the order terminal from which the reservation was received.

The order terminal is a network-connectable personal computer owned by a user who places the print order regarding the image data. Alternatively, the order terminal may be a terminal that is dedicated to placing orders and installed at a printing service provider.

Any image data can be used as the image data to be printed, such as image data obtained by the user with a digital camera or image data recorded in a CD-R by a printing service provider after digitization of photographs obtained by the user, for example. The image data are sent from the order terminal, together with the order information.

The print order refers to an order for printing the image data by using a photographic printer, for generating a picture postcard or a calendar, or for printing an image on a T-shirt, a mug cup, a jigsaw puzzle, or a watch face, for example.

The printing processing refers to processing to be carried out on the image data for printing the image data according to the order information. More specifically, the printing processing includes any processing carried out on the image data at the time of printing thereof, such as image processing on the image data and printing processing by the photographic printer, for example.

The deadline may be a time period, instead of a specific time.

In the first print order processing method of the present invention, a list representing charges for the printed matter in accordance with various deadlines may be displayed on the order terminal so that the reservation of the deadline based on the displayed list can be received.

The charges for the printed matter are set higher for a date or a time period when the printing processing means is busier or expected to be busier. The list is set for a type of the printed matter (such as a print size, a picture postcard generation, and printing on a T-shirt, for example) and/or a quantity thereof. The charges may be changed higher even for a date or a time period when the printing processing means is generally not so busy, if more print orders begin to come in. On the contrary, even on a date or in a time period when the printing processing means is expected to be comparatively busy, the charges may be lowered if few print orders are received.

A second print order processing method of the present invention is a method for obtaining printed matter according to the steps of receiving image data and order information representing the content of a print order regarding the image data sent from an order terminal that places the print order, selecting one of printing service providers that carries out printing processing on the image data according to the order information, and causing printing processing means of the selected printing service provider to carry out the printing processing on the image data. The second print order processing method further comprises the steps of:

receiving from the order terminal a reservation of a deadline regarding the printed matter to be generated at the selected printing service provider; and sending information representing the reserved deadline, the order information, and the image data to the selected printing service provider via a network, with reference to the information representing the reserved deadline.

In the second print order processing method of the present invention, a list representing charges for the printed matter in accordance with various deadlines may be displayed on the order terminal so that the reservation of the deadline based on the displayed list can be received.

It is preferable for the list to be generated for each of the printing service providers.

A third print order processing method of the present invention comprises the step of controlling the printing processing means so as to complete the printing processing regarding the print order at the reserved deadline, based on the information representing the reserved deadline sent according to the second print order processing method of the present invention.

A first print order processing apparatus of the present invention is an apparatus for obtaining printed matter by receiving image data and order information representing the content of a print order regarding the image data sent from an order terminal that places the print order and then by carrying out printing processing on the image data by using printing processing means according to the order information. The first print order processing apparatus comprises:

reception means for receiving a reservation of a deadline regarding the printed matter from the order terminal; and control means for controlling the printing processing means so as to complete the printing processing at the reserved deadline, regarding the print order placed by the order terminal from which the reservation was received.

The first print order processing apparatus of the present invention may further comprise storage means for storing a list representing charges for the printed matter in accordance with various deadlines. In this case, the reception means displays the list on the order terminal and receives the reservation of the deadline based on the list.

A second print order processing apparatus of the present invention is an apparatus for obtaining printed matter according to the steps of receiving image data and order information representing the content of a print order regarding the image data sent from an order terminal that places the print order, selecting one of printing service providers that carries out printing processing on the image data according to the order information, and causing printing processing means of the selected printing service provider to carry out the printing processing on the image data. The second print order processing apparatus comprises:

reception means for receiving from the order terminal a reservation of a deadline regarding the printed matter to be generated at the selected printing service provider; and transmission means for sending information representing the reserved deadline, the order information, and the image data to the selected printing service provider via a network, with reference to the information representing the reserved deadline.

The second print order processing apparatus of the present invention may further comprise storage means for storing a list representing charges for the printed matter in accordance with various deadlines. In this case, the reception means displays the list on the order terminal and receives the reservation of the deadline based on the list.

It is preferable for the list to be generated and stored in the storage means, for each of the printing service providers.

A third print order processing apparatus of the present invention comprises control means for controlling the printing processing means so as to complete the printing processing at the reserved deadline regarding the print order placed by the order terminal, based on the information representing the reserved deadline sent by the second print order processing apparatus of the present invention.

The first to third print order processing methods of the present invention may be provided as programs that cause a computer to execute the methods.

According to the first print order processing method and the first print order processing apparatus of the present invention, the reservation of the deadline regarding the printed matter is received from the order terminal, and the printing processing means is controlled so as to complete the printing processing at the reserved deadline, regarding the print order placed by the order terminal. Therefore, the user who places the print order can accurately estimate the deadline.

According to the second and third print order processing methods and according to the second and third print order processing apparatuses of the present invention, the reservation of the deadline regarding the printed matter is received from the order terminal, and the printing processing means of the selected printing service provider is controlled so as to complete the printing processing at the reserved deadline, regarding the print order placed by the order terminal. Therefore, the user who places the print order can accurately estimate the deadline.

In the first to third print order processing methods and apparatuses of the present invention, by displaying on the order terminal the list representing the charges for the printed matter in accordance with various deadlines, the user who places the print order can understand the charge for the printed matter in accordance with the deadline he/she wishes to reserve. At this time, the user may wish to pay less and wait longer, or may wish to pay more and obtain the printed matter earlier. Therefore, by setting the printing charges according to how busy the printing processing means is, the print order in accordance with the user's demand can be received. Furthermore, since the user can be induced to place the print order at the time the charge is low, the printing processing means can operate evenly. Moreover, by operating the printing processing means evenly, a high-performance laboratory system enabling processing of a large amount of print orders becomes unnecessary. Therefore, each of the printing service providers can achieve a cost reduction and downsizing of a system therein, which also leads to a reduction in the printing charges.

By generating the list for each of the printing service providers, the user who places the print order can request printing from any one of the printing service providers that provides a better service. In this manner, the user is benefited, and each of the printing service providers can count the user as a customer thereof, by making the printing service more attractive.

BRIEF DESCRIPTION OF THE DRAWINGS

FIG. 10 shows a list of candidates for a deadline in the second embodiment;

DESCRIPTION OF THE PREFERRED EMBODIMENTS

Figure 1:
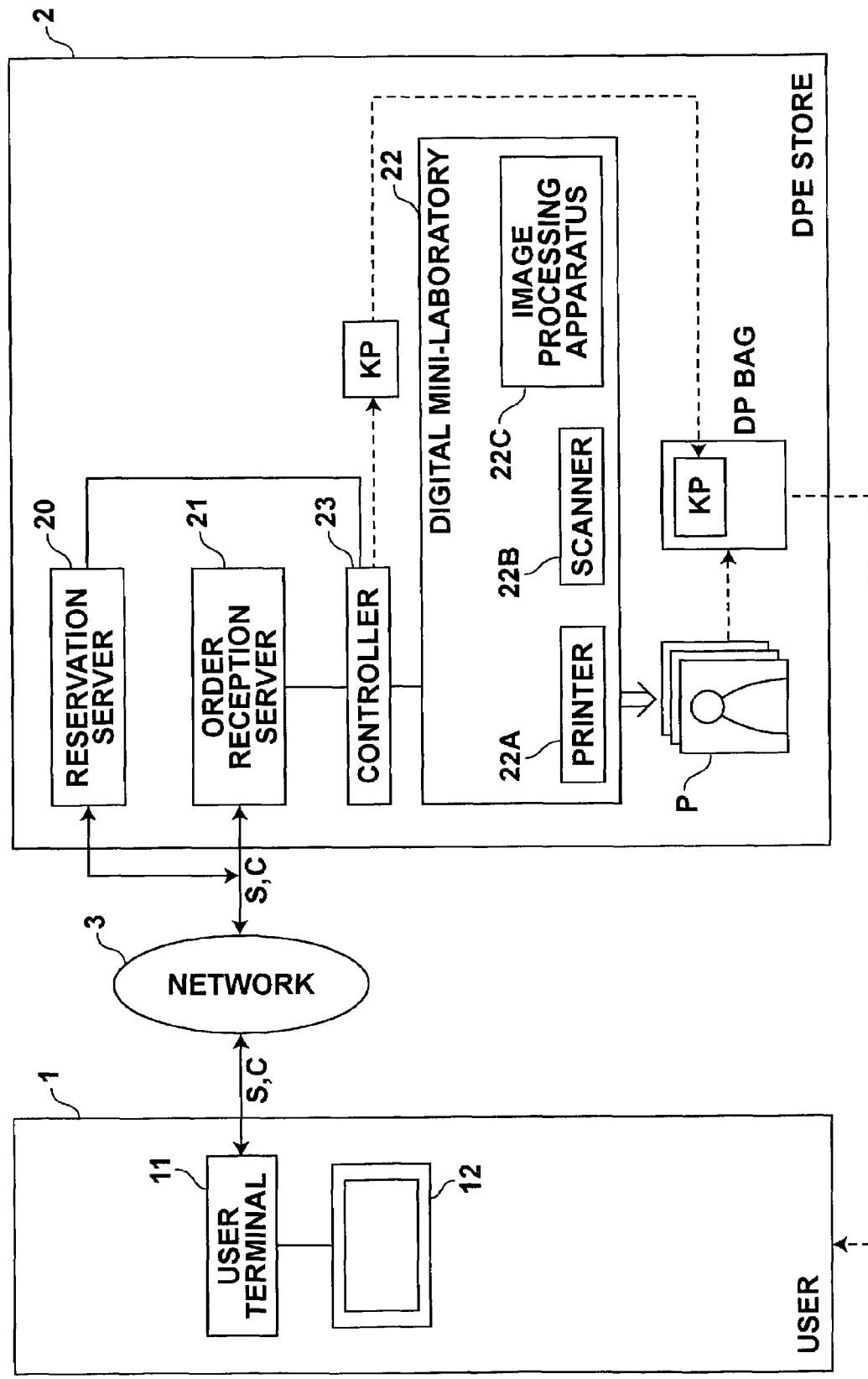
FIG. 1 is a block diagram showing a configuration of a first embodiment of a printing service system comprising a print order processing apparatus of the present invention.

Hereinafter, embodiments of the present invention will be explained with reference to the accompanying drawings. FIG. 1 is a block diagram showing a configuration of a first embodiment of a printing service system comprising a print order processing apparatus of the present invention. As shown in FIG. 1, the printing service system in the first embodiment exchanges data, prints, and the like, between a user 1 and a DPE store 2. In FIG. 1, a solid line represents a flow of data while a broken line represents a flow of an object.

The user 1 has a personal computer acting as a user terminal 11. The personal computer comprises a hard disc, a monitor 12, a keyboard, a mouse, a CD-ROM drive, and a PC card slot for reading image data from a recording medium for a digital camera (such as a Smart Media ▯ and a Compact Flash ▯, for example). The user 1 can place a print order from the DPE store 2 via a network 3 such as the Internet. In the case where the user 1 does not have a personal computer, the user 1 can use a terminal that is dedicated to placing orders and installed in a service station or the like.

The DPE store 2 comprises a reservation server 20 for receiving a reservation of a deadline, an order reception server 21 for receiving the print order, a digital mini-laboratory 22 for obtaining a print or prints P (hereinafter referred to as the prints P) based on image data S sent from the user terminal 11 via the network 3 at the time the print order is placed, and a controller 23 for controlling the reservation server 20, the order reception server 21, and the digital mini-laboratory 22.

The network 3 refers to a network such as the Internet, and includes any communication means having a communication speed that is fast enough for sending the image data S and order information, such as a dedicated line, a CATV network, a dial-up connection, LAN, or a wireless communication network, for example.

The reservation server 20 is always connected to the network 3 and displays a page for deadline reservation on the monitor 12 of the user terminal 11 whenever the user terminal 11 accesses the reservation server 20. The user 1 reserves the deadline for the print order on the reservation page, as will be explained later. The reservation server 20 has list information for displaying a candidate date list in the reservation page on the user terminal 11. The candidate date list represents printing charges according to various deadlines. In the candidate date list, the printing charges are set higher for a date or a time period when the digital mini-laboratory 22 is busier or expected to be busier. The printing charges are also determined according to the content of printing processing (such as a print size, picture postcard generation, and printing on a T-shirt, for example) and/or a quantity. The printing charges are changed in the candidate date list, depending on how busy the digital mini-laboratory 22 is. For example, even on a date or in a time period when the digital mini-laboratory 22 is generally not so busy, the printing charges are made to be higher if print orders begin to concentrate to make the digital mini-laboratory 22 busy. On the contrary, even on a date or in a time period for which the printing charges have been set higher, the printing charges are made to be lower if few print orders come in.

The order reception server 21 stores the image data S and order information C sent from the user terminal 11, as will be explained later. The order reception server 21 is always connected to the network 3.

The digital mini-laboratory 22 generates the prints P by carrying out printing processing on the image data S. The digital mini-laboratory 22 comprises a printer 22A for obtaining the prints P based on the image data S, a scanner 22B for scanning a negative film, and an image processing apparatus 22C for carrying out image processing on the image data S. The digital mini-laboratory 22 also has a function of writing the image data S in a recording medium such as a CD-R.

The controller 23 comprises a computer and a printer, and controls and manages the reservation server 20, the order reception server 21, and the digital mini-laboratory 22. An operator at the DPE store 2 operates the controller 23. The controller 23 prints a label KP on which a total printing charge, the name of the user 1, the content of printing, and an order ID corresponding to the order information C are printed. By pasting the label KP on a DP bag containing the prints P, the prints P are easily classified and the user 1 is easily invoiced.

The controller 23 sends the image data S and the order information C sent from the user terminal 11 to the digital mini-laboratory 22 via the order reception server 21 so that the printing processing is completed at the reserved deadline received by the reservation server 20. In this manner, the controller 23 causes the digital mini-laboratory 22 to carry out the printing processing.

Information representing the reserved deadline is temporarily stored in the controller 23. The printing charges in accordance with the various deadlines are also stored in the controller 23 to be used for calculating the total printing charge.

In this embodiment, the user 1 accesses the reservation server 20 and the order reception server 21 in the DPE store 2 from the user terminal 11 while using a general-purpose Web browser software, and reserves the deadline and places the print order.

Figure 2:
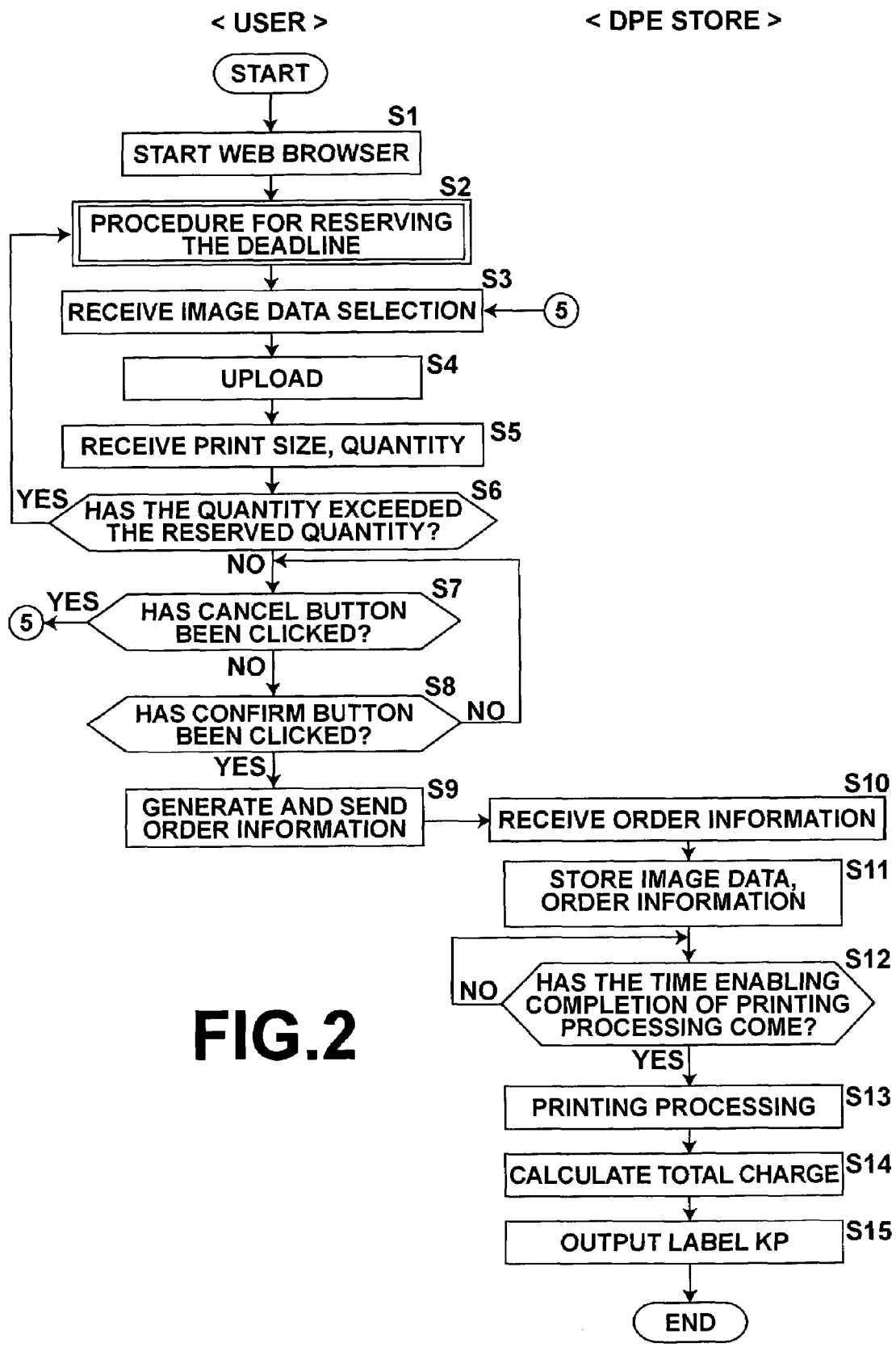
FIG. 2 is a flow chart showing the operation of the first embodiment.

The operation of the first embodiment will be explained next. FIG. 2 is a flow chart showing the operation of the first embodiment. In this example, ordinary printing (that is, printing using the printer 22A of the digital mini-laboratory 22) is carried out by using the image data S owned by the user 1.

Figure 3:
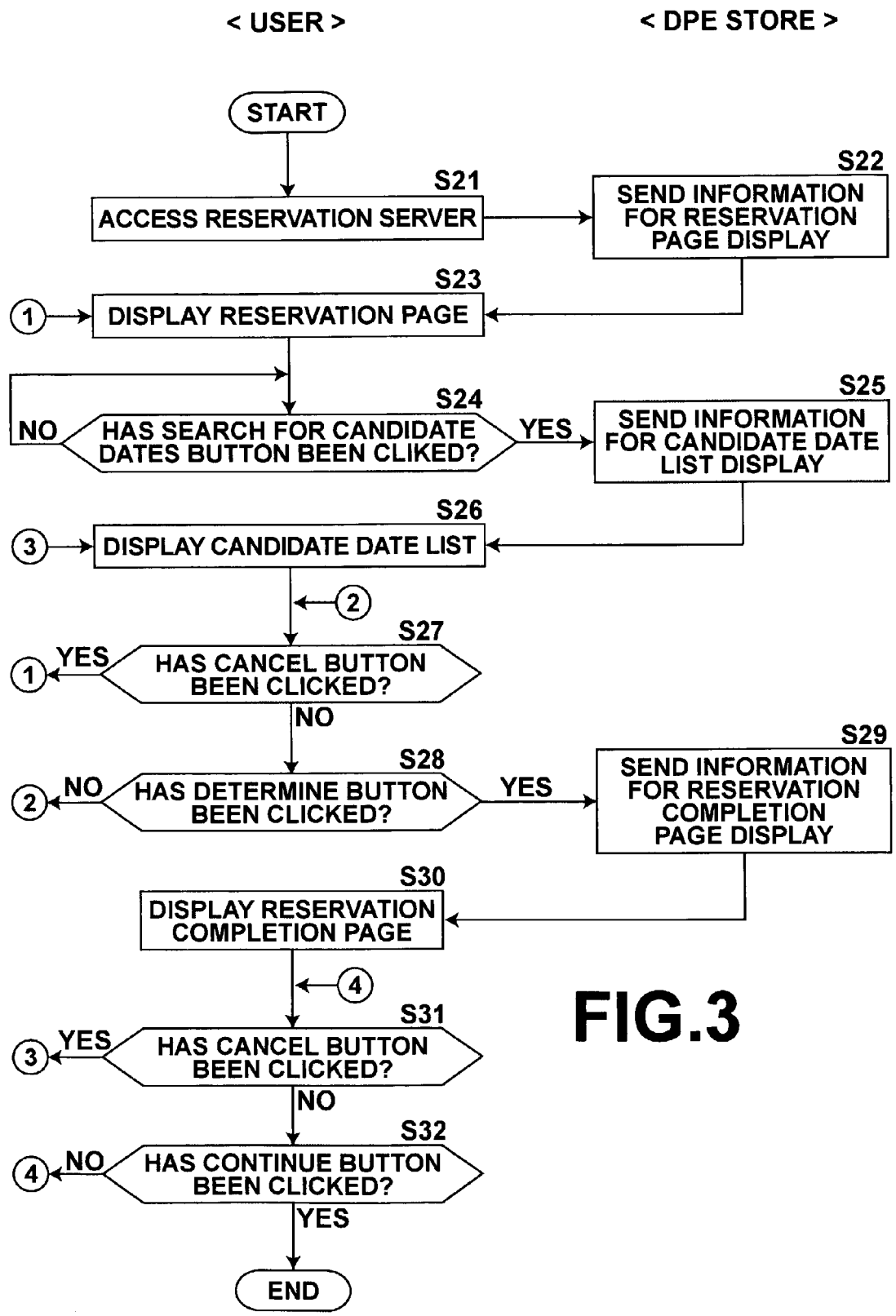
FIG. 3 is a flowchart showing a procedure for reservation of a deadline.

The user 1 starts the Web browser (Step S1), and accesses the reservation server 20 in the DPE store 2. The user 1 then reserves the deadline (Step S2). FIG. 3 is a flow chart showing a procedure for reserving the deadline. When the user terminal 11 accesses the reservation server 20 in the DPE store 2 (Step S21), information for displaying the page for deadline reservation is sent from the reservation terminal 20 to the user terminal 11 (Step S22). The reservation page is then displayed on the monitor 12 of the user terminal 11 (Step S23).

Figure 4:
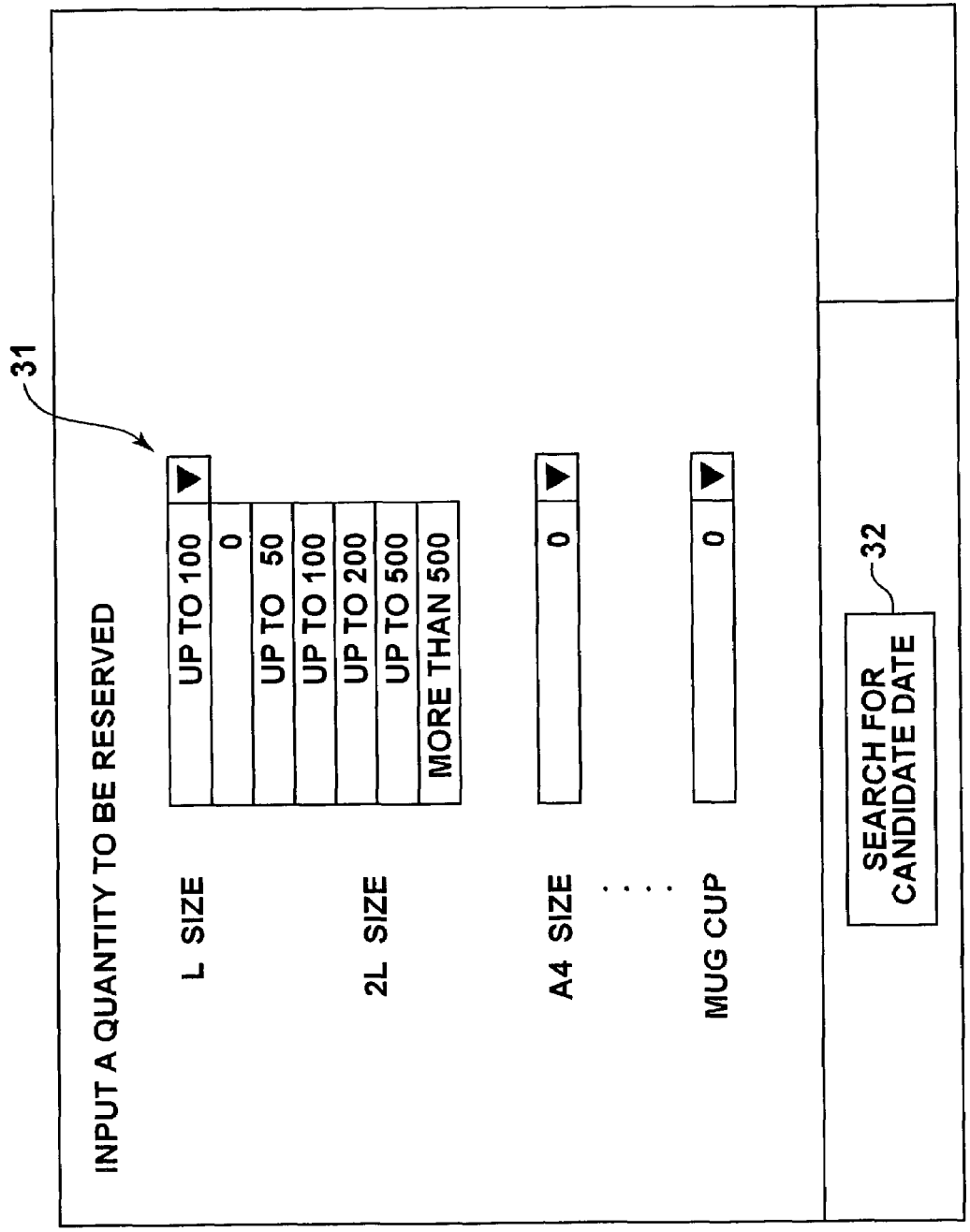
FIG. 4 shows a reservation page.

FIG. 4 shows the reservation page. In the reservation page are displayed quantity input fields 31 for inputting quantities in accordance with print sizes and types of printing, as shown in FIG. 4. A "Search for Candidate Dates" button 32 for searching for candidates for the deadline is also displayed in the reservation page. Each of the quantity input fields 31 comprises a pull-down menu, and text "Input a Quantity to be reserved" is also displayed. The user 1 inputs a quantity therein, regarding a desired one of the print sizes or a desired one of the types of printing. Whether or not the "Search for Candidate Dates" button 32 has been clicked is then judged (Step S24). The judgment at Step S24 is repeated until the button 32 is clicked. If a result at Step S24 is affirmative, information for displaying candidate dates is sent from the reservation server 20 to the user terminal 11 (Step S25), and the candidate date list is shown on the monitor 12 of the user terminal 11 (Step S26).

Figure 5:
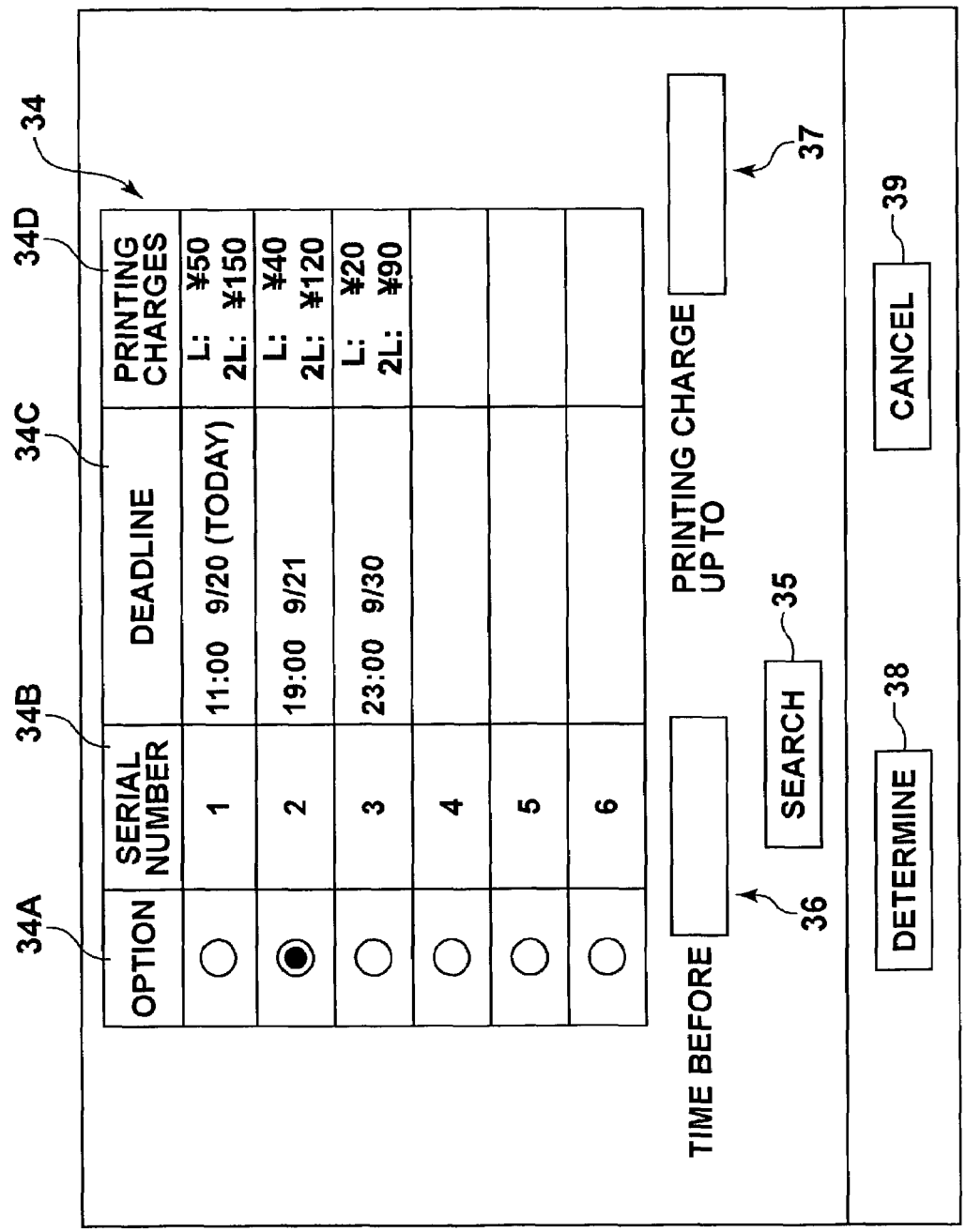
FIG. 5 shows a list of candidates for the deadline in the first embodiment.

FIG. 5 shows the candidate date list. In the candidate date list shown in FIG. 5 are displayed a candidate date list 34, a Search button 35 for searching for a more detailed candidate date list, a time designation input box 36 for designating a time used for the search, a printing charge input box 37 for specifying a limit of the printing charges, a Determine button 38 for determining the time to be reserved, and a Cancel button 39 for returning to the reservation page shown in FIG. 4. Each row of the candidate date list 34 includes an option button 34A for deadline selection, a serial number 34B, a deadline 34C, and printing charges 34D. The user 1 refers to the deadline 34C and the printing charges 34D in each row of the candidate date list 34, and selects the option button 34A corresponding to the desired deadline and the desired printing charges. In the case where the candidate date list 34 does not include the desired deadline and the desired printing charges, the user 1 can input the desired deadline and/or the limit of the printing charges in the time designation input box 36 and/or the printing charge input box 37. The user then clicks the Search button 35. In this manner, the user can search for another candidate date and can display the candidate date list 34 including the deadline other than the deadlines displayed earlier.

Whether or not the Cancel button 39 has been clicked is then judged (Step S27). If a result at Step S27 is affirmative, the procedure returns to Step S23. If the result at Step S27 is negative, whether or not the Determine button 38 has been clicked is then judged (Step S28). If a result at Step S28 is negative, the procedure returns to Step S27. If the result at Step S28 is affirmative, information for displaying a reservation completion page is sent from the reservation server 20 to the user terminal 11 (Step S29), and the reservation completion page is displayed on the monitor 12 of the user terminal 11 (Step S30).

Figure 6:
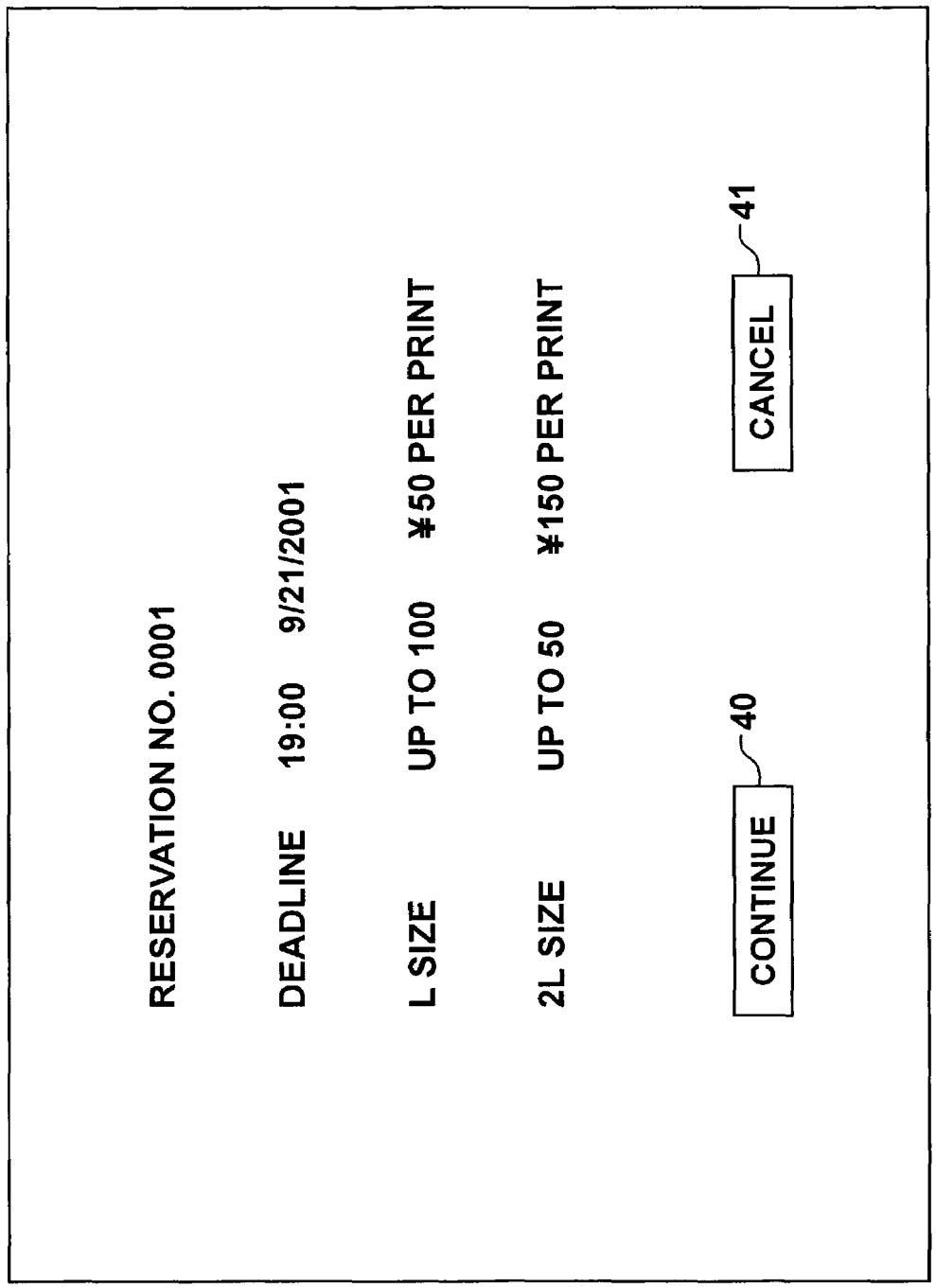
FIG. 6 shows a reservation completion page.

FIG. 6 shows the reservation completion page. In the reservation completion page shown in FIG. 6 are displayed a reservation number, the selected deadline, the printing charges corresponding to the deadline, a Continue button 40 for continuing a procedure for placing the print order, and a Cancel button 41 for displaying again the candidate date list shown in FIG. 5. Whether or not the Cancel button 41 has been clicked is then judged (Step S31). If a result at Step S31 is affirmative, the procedure returns to Step S26. If the result at Step S31 is negative, whether or not the Continue button 40 has been clicked is then judged (Step S32). If a result at Step S32 is negative, the procedure returns to Step S31. If the result at Step S32 is affirmative, reservation of the deadline is completed and the procedure returns to the flow chart in FIG. 2. The user needs to write down the reservation number or print the reservation completion page, since the reservation number is necessary for receiving the prints P.

Figure 7:
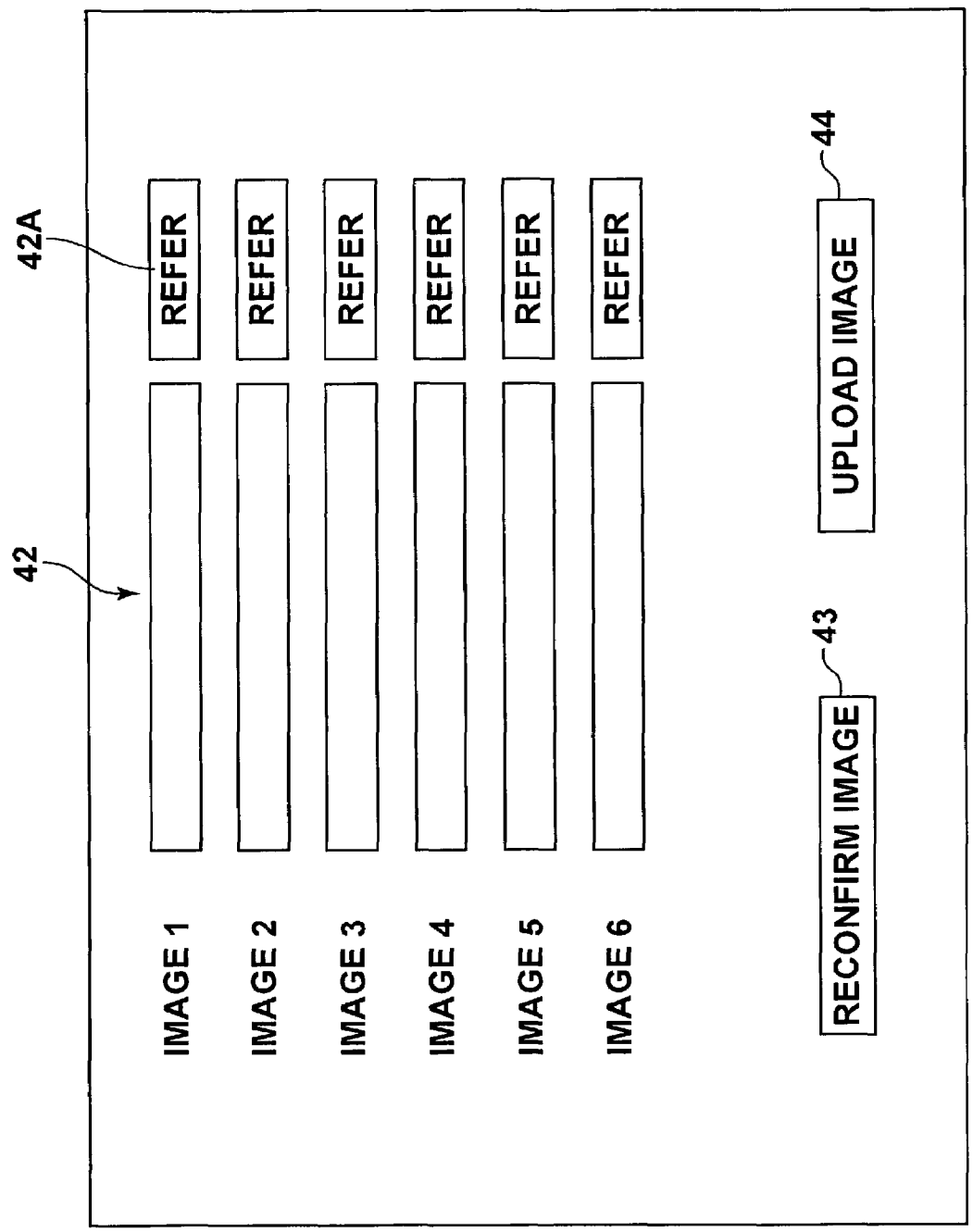
FIG. 7 shows an image data selection page.

After the reservation has been completed in the above manner, an image data selection page is displayed on the monitor 12 of the user terminal 11, and selection of the image data S to be printed is received (Step S3). FIG. 7 shows the image data selection page. In the image data selection page are displayed file name input fields 42 for inputting file names of the image data S to be printed, a Reconfirm Image button 43 for displaying the image data S in order to confirm the image data S whose file name has been input in each of the file name input fields 42, and an Upload Image button 44 for sending the image data S to the DPE store 2, as shown in FIG. 7. A Refer button 42A is shown in each of the file name input fields 42, and the user can select the image data S by clicking the Refer button 42A to open a folder in which the image data S are stored. The user can also display a thumbnail image of the image data S to be printed, by inputting the file name of the image data S used for display of the thumbnail image and then by clicking the Reconfirm Image button 43. When the Upload Image button 44 is clicked, the image data S selected in the image data selection page are uploaded to the order reception server 21 of the DPE store 2 (Step S4).

Figure 8:
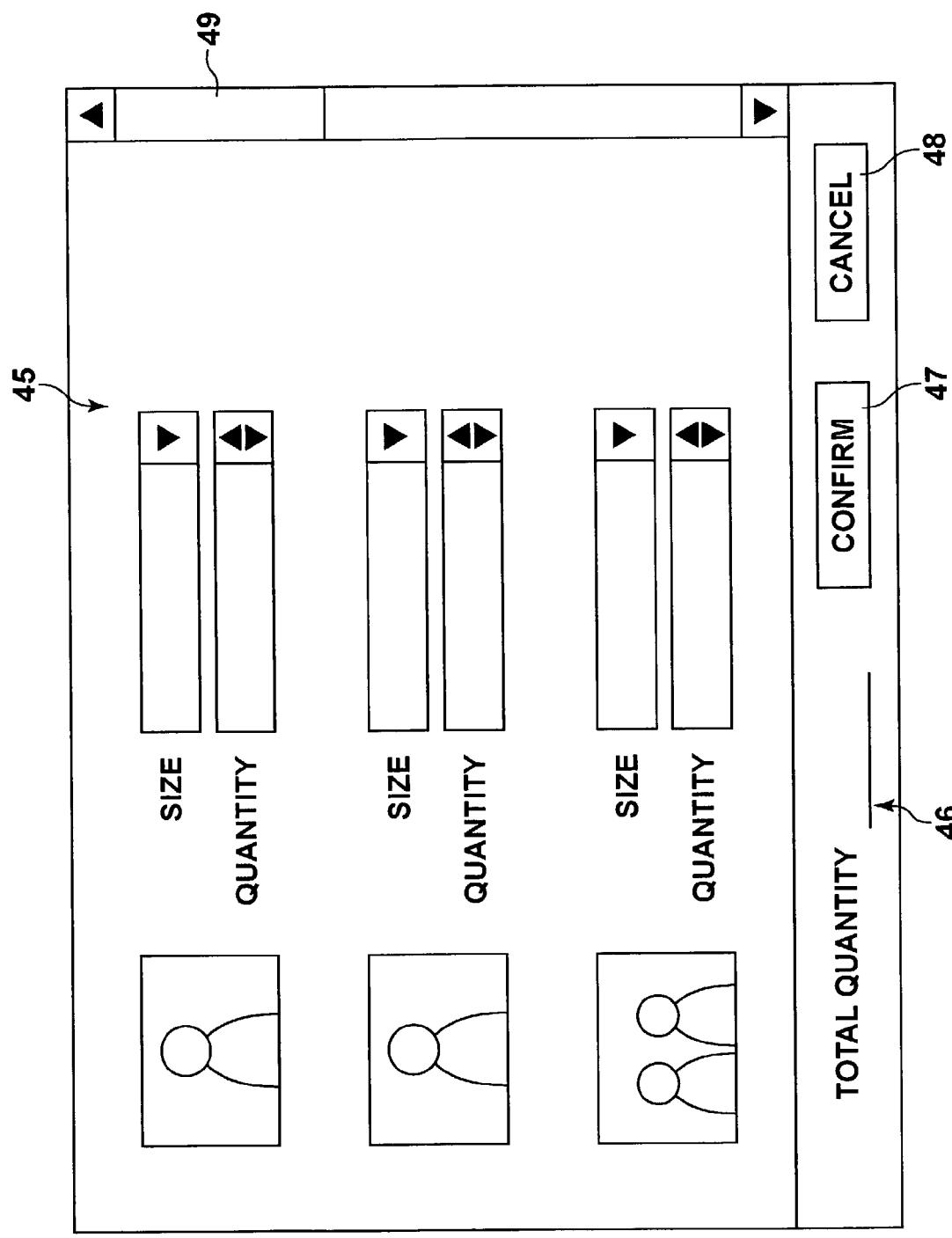
FIG. 8 shows an order page.

An order page is then displayed on the monitor 12, and a print size input and a quantity input are received (Step S5). FIG. 8 shows the order page. As shown in FIG. 8, the order page includes input fields 45 each of which is used for inputting the print size and the quantity, a display area 46 for displaying a total quantity, a Confirm button 47 for confirming the content of the print order, and a Cancel button 48 for returning to the image data selection page shown in FIG. 7, in addition to the thumbnail images of the image data S to be printed. By scrolling the display with a scroll bar 49, the user 1 can view all the images to be printed.

The user 1 inputs the print size and the quantity for the selected image data S in each of the input fields 45. At this time, the total quantity is calculated and displayed in the display area 46. Whether or not the total quantity has exceeded the sum of the quantities reserved in the reservation page is then judged (Step S6). If a result at Step S6 is affirmative, the procedure returns to Step S2 for receiving an input of the quantity to be reserved again. Whether or not the Cancel button 48 has been clicked is then judged (Step S7). If a result at Step S7 is affirmative, the procedure returns to Step S3. If the result at Step S7 is negative, whether or not the Confirm button has been clicked is then judged (Step S8). If a result at Step S8 is negative, the procedure returns to Step S27. If the result at Step S8 is affirmative, the order information C is generated and sent to the DPE store 2 (Step S9).

The order reception server 21 of the DPE store 2 receives the order information C (Step S10), and stores the order information C and the image data S (Step S11). Whether or not the time enabling completion of the printing processing at the reserved deadline has come is then judged (Step S12). A result at Step S12 becomes affirmative when the time comes, and the controller 23 sends from the order reception server 21 to the digital mini-laboratory 22 the image data S and the order information C that were sent from the user terminal 11. The digital mini-laboratory 22 carries out the printing processing (Step S13). More specifically, predetermined image processing is carried out on the image data S and the image data S are printed by the printer 22A according to the order information C. In this manner, the prints P are generated. At the same time, the order ID is printed on the backside of each of the prints P, and the prints P are sorted according to the order information C.

The total printing charge is then calculated according to the printing charges corresponding to the deadline (Step S14). The name of the user, the content of printing processing, the total printing charge, the order ID, and the reservation ID are printed on the label KP (Step S15), and the procedure ends. The operator in the DPE store 2 pastes the label KP on the DP bag containing the prints P on which the order ID is printed. The user 1 visits the DPE store 2 after the deadline, and notifies the reservation number. The user 1 then receives the prints P after paying the total printing charge. The prints P may be delivered or mailed to the user 1.

As has been described above, in this embodiment, the printing processing is carried out at the digital mini-laboratory 22 so as to finish the printing processing at the deadline reserved by the user with use of the user terminal 11. Therefore, the user 1 can accurately estimate the deadline.

Furthermore, by displaying on the user terminal 11 the candidate date list representing the printing charges according to the various deadlines, the user 1 can understand the printing charges corresponding to the deadlines. At this time, if the printing charges are set according to how busy the digital mini-laboratory 22 is, the print order can be received in accordance with a desire by the user, such as low cost for slow processing or high cost for fast processing. Since the user 1 can be induced to place the print order on the date and at the time of low printing charges, printing processing by the digital mini-laboratory 22 can be carried out evenly. Therefore, a high-performance laboratory system enabling processing of a large amount of print orders becomes unnecessary. Consequently, the system in the DPE store 2 can be downsized and the cost therefor can be lowered. In this manner, the charges for the printing services at the DPE store 2 can also be lowered.

Figure 9:
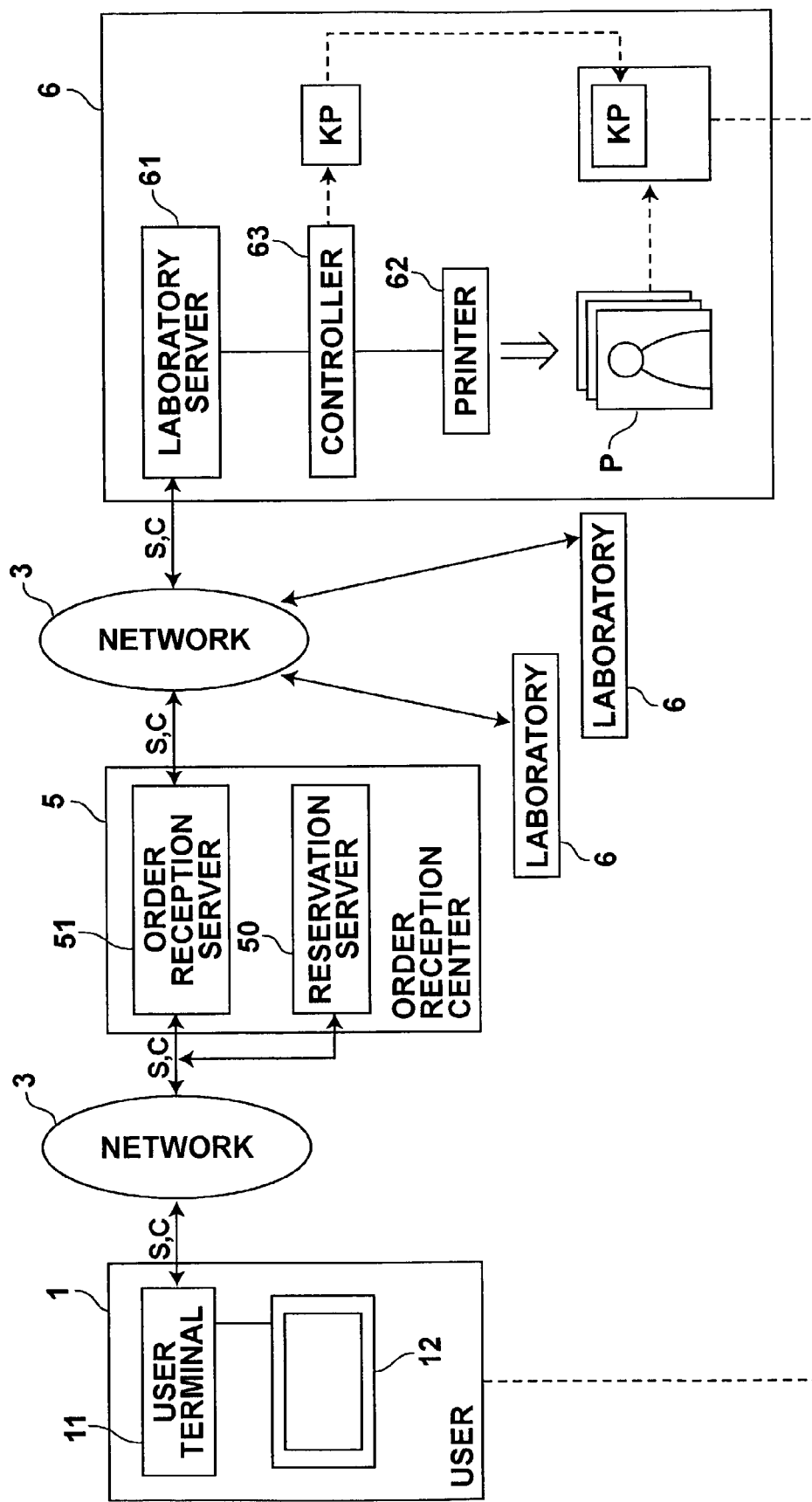
FIG. 9 is a block diagram showing a configuration of a second embodiment of a printing service system comprising a print order processing apparatus of the present invention.

A second embodiment of the present invention will be explained next. FIG. 9 is a block diagram showing the second embodiment of a printing service system adopting a print order processing apparatus of the present invention. In the second embodiment, the same elements as in the first embodiment have the same reference numbers, and detailed explanations thereof are omitted. In the second embodiment, data, prints, and the like are exchanged between a user 1, an order reception center 5 for receiving print orders, and laboratories 6. In FIG. 9, a flow of data is shown by a solid line while a flow of an object is shown by a broken line.

The order reception center 5 comprises a reservation server 50 having the same functions as the reservation server 20 in the first embodiment, and an order reception server 51. The order reception server 51 receives image data S and order information C from a user terminal 11, selects one of the laboratories 6 that carries out printing processing based on information representing a deadline designated by the user 1, and sends the image data S and the order information C to the selected laboratory 6.

The reservation server 50 stores list information for displaying a candidate date list representing printing charges in accordance with various deadlines regarding the laboratories 6. Each of the laboratories 6 can access the reservation server 50, and can change the corresponding printing charges. The user 1 designates the deadline with reference to the candidate date list, and the reservation server 50 includes the information representing the deadline in the order information C received by the order reception server 51.

Each of the laboratories 6 comprises a laboratory server 61 for print order reception, a printer 62 for generating a print or prints P (hereinafter referred to as the prints P) based on the image data S and the order information C sent from the user terminal 11 to the order reception center 5 via a network 3, and a controller 63 for controlling the laboratory server 61 and the printer 62. In the second embodiment, the printer 62 has a function of carrying out image processing on the image data S.

The controller 63 comprises a computer and a printer. The controller 63 manages and controls the laboratory server 61 and the printer 62, and is managed by an operator at the corresponding laboratory 6. The controller 63 also outputs a label KP on which a total printing charge, the name of the user 1, the content of printing, and an order ID issued in accordance with the order information C are printed. By pasting the label KP on a DP bag containing the prints P, the prints P are easily classified and the user 1 is easily invoiced.

Based on the information representing the deadline included in the order information C, the controller 63 sends from the laboratory server 61 to the printer 62 of the selected laboratory 6 the image data S and the order information C that were sent from the user terminal 11 via the order reception center 5, so that the printing processing can be completed at the deadline received by the reservation server 50 in the order reception center 5. In this manner, the controller 63 causes the printer 62 to carry out the printing processing.

The information representing the reserved deadline is temporarily stored in the controller 63. The printing charges in accordance with the deadline are also stored in the controller 63 and used for calculation of the total printing charge.

In the second embodiment, a procedure carried out between the user terminal 11 and the order reception center 5 is the same as the procedure from Step S1 to Step S10 in the flow chart in the first embodiment, and detailed explanations thereof are omitted. In the second embodiment, the candidate date list is shown for each of the laboratories 6 in a candidate date list display page shown in FIG. 10. The user 1 selects an option button corresponding to a desired one of the deadlines and/or the laboratory 6 whose printing charges are preferable for the user 1. In this manner, the information representing there served deadline and the selected laboratory is temporarily stored in the reservation server 50, and written in the order information C received by the order reception server 51. The order reception server 51 sends the image data S and the order information C received from the user terminal 11 to the selected laboratory 6 represented by the information input from the reservation server 50.

Figure 11:
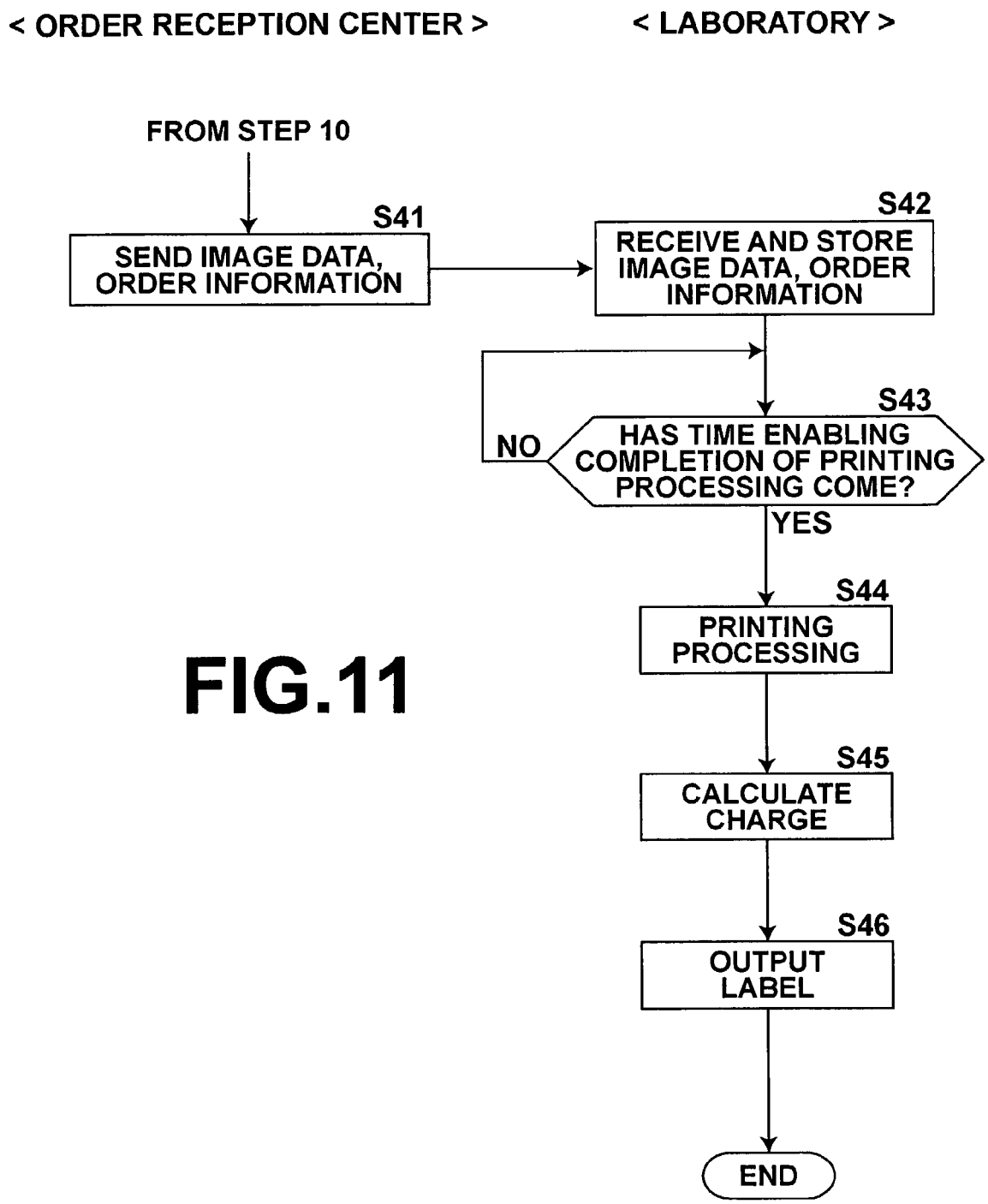
FIG. 11 is a flow chart showing the operation of the second embodiment.

FIG. 11 is a flow chart showing the procedure that is different from the procedure in the first embodiment. When the order reception center 5 receives the order information C, the image data S and the order information C are sent to the laboratory server 61 of the laboratory 6 that is represented by the information on the name of the laboratory input from the reservation server 50 (Step S41). The laboratory server 61 receives and stores the image data S and the order information C (Step S42). Whether or not the time enabling completion of the printing processing at the reserved deadline has come is then judged (Step S43). A result at Step S43 becomes affirmative when the time comes, and the printing processing is carried out (Step S44). More specifically, the controller 63 sends the image data S and the order information C from the laboratory server 61 to the printer 62. The printer 62 carries out the predetermined image processing on the image data S, and prints the image data S according to the order information C. In this manner, the prints P are generated. At this time, the order ID is printed on the backside of each of the prints P, and the prints P are sorted according to the order information C.

The total printing charge is then calculated based on the printing charges in accordance with the deadline (Step S45), and the name of the user 1, the content of printing, the total printing charge, the order ID, a reservation number, and the like are printed on the label KP (Step S46) to end the procedure. The operator at the DPE store 2 pastes the label KP on the DP bag containing the prints P, and puts in the DP bag the prints P with the order ID printed on the back. The prints P may be delivered or mailed to the user.

As has been described above, in the second embodiment, the printing processing is carried out in the laboratory selected by the user 1, so as to be completed at the deadline reserved by the user with use of the user terminal 11. Therefore, the deadline of the prints P can be estimated with accuracy.

Furthermore, by displaying on the user terminal 11 the candidate date list representing the printing charges according to the various deadlines, the user 1 can understand the printing charges. At this time, if the printing charges are set according to how busy each of the laboratories 6 is, the print order can be received in accordance with a desire by the user, such as low cost for slow processing or high cost for fast processing. Since the user 1 can be induced to place the print order on the date and at the time of low printing charges, printing processing in each of the laboratories 6 can be carried out evenly. Therefore, a high-performance laboratory system enabling processing of a large amount of print orders becomes unnecessary. Consequently, the system can be downsized and the cost therefor can be lowered. In this manner, the charges for the printing services can also be lowered.

Moreover, by generating the candidate date list representing the printing charges in accordance with the various deadlines for each of the laboratories 6, the user 1 who places the print order can request printing from one of the laboratories 6 providing the deadline and the printing charges that are preferable for the user 1. In this manner, the user 1 is benefited, and each of the laboratories 6 can count the user 1 as a customer thereof, by providing the printing services more attractively.

Figure 12:
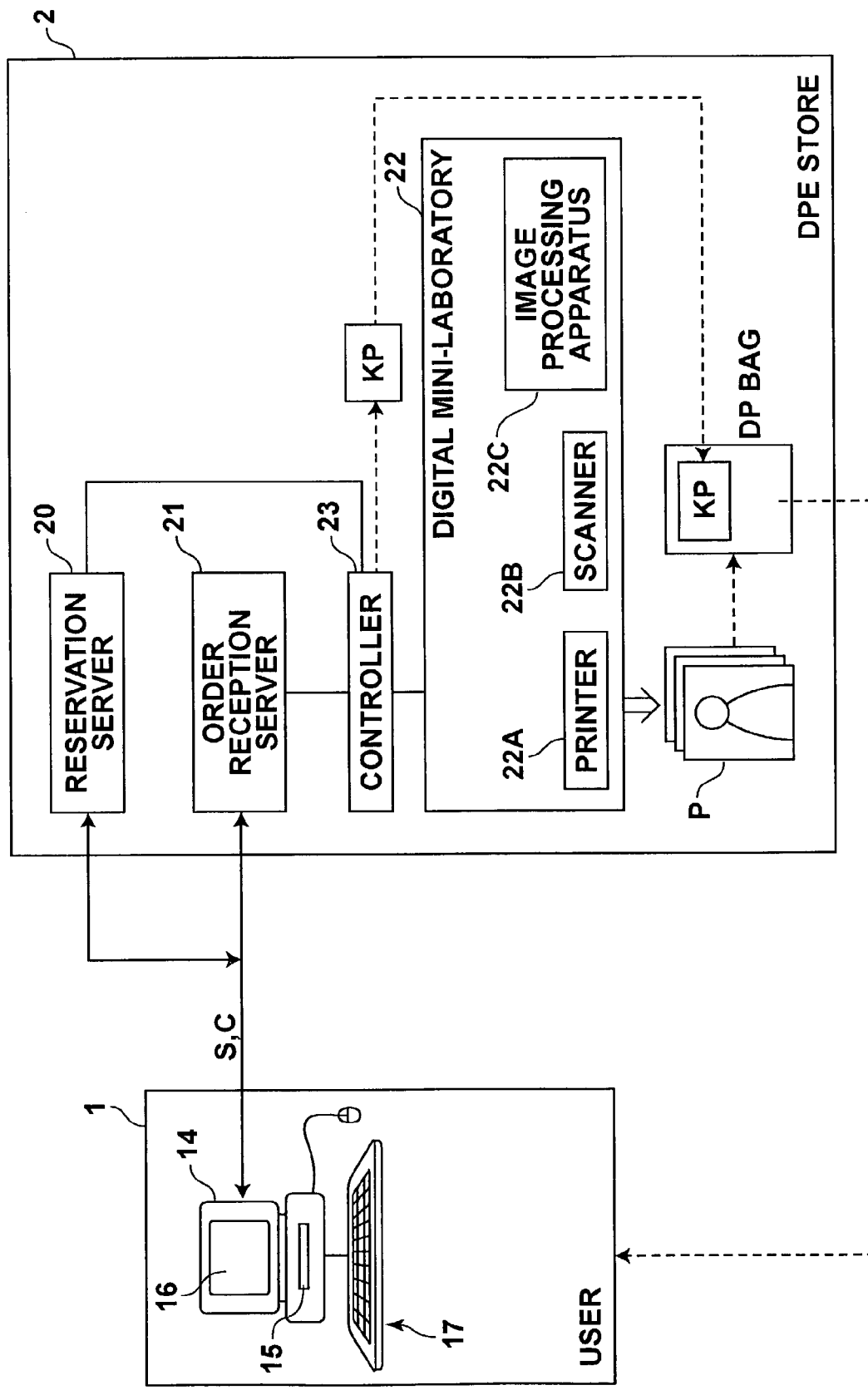
FIG. 12 is a block diagram showing a configuration of a third embodiment of a printing service system comprising a print order processing apparatus of the present invention.

A third embodiment of the present invention will be explained next. FIG. 12 is a block diagram showing a configuration of the third embodiment of a printing service system adopting a print order processing apparatus of the present invention. In the third embodiment, the same elements as in the first embodiment have the same reference numbers, and detailed explanations thereof are omitted. In the third embodiment, data, prints, and the like are exchanged between a user 1 and a DPE store 2. However, the user 1 places a print order by using a dedicated order terminal 14 that has Web browser installed therein and is installed in a service station or the like, instead of the user terminal 11 in the above embodiments.

The order terminal 14 comprises a medium drive 15 for reading image data S from a recording medium M brought by the user 1, a monitor 16 for carrying out various kinds of display, and input means 17 comprising a mouse and a keyboard for carrying out various kinds of inputs.

The user 1 can place the print order and reserve a deadline while using the order terminal 14, in the same manner as by the user terminal in the first embodiment.

In the above embodiments, the Web browser of the user terminal 11 or the order terminal 14 is used for placing the print order and for reserving the deadline. However, dedicated print order software for deadline reservation and for placing a print order may be installed in the user terminal 11 or in the order terminal 14. The user can place the print order or reserve the deadline, by using the print order software.

In the case where the print order software is used in the first embodiment, the print order software is provided to the user 1 by being recorded in a CD-R together with access information such as the IP address or URL for accessing the DPE store 2. The CD-R may be provided to the user 1 at the time the user 1 purchases a digital camera, or when the user 1 visits the DPE store 2, or on the street, for example.

The user 1 sets the CD-R in the CD-ROM drive (not shown) of the user terminal 11 and installs the print order software recorded in the CD-R in the user terminal 11. At this time, the access information recorded in the CD-R is input to the software. In this manner, the user 1 can view and manipulate the image data S, generate the order information C, reserve the deadline, and place the print order by using the print order software. When the deadline is reserved and when the image data and the order information C are sent, the user terminal 11 accesses the reservation server 20 and the order reception server 21 in the DPE store 2 corresponding to the access information. In the case of the order terminal 14, an operator at the DPE store 2 installs the print order software in the order terminal 14.

A skilled artisan would know that computer readable media are not limited to any specific type of storage device and include any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A print order processing method comprising the steps of receiving image data and order information representing the content of a print order regarding the image data sent from an order terminal that places the print order, and obtaining printed matter by carrying out printing processing on the image data by using printing processing means according to the order information, the print order processing method further comprising the steps of:
    receiving a reservation of a deadline regarding the printed matter from the order terminal; and
    controlling the printing processing means so as to complete the printing processing at the reserved deadline, regarding the print order placed by the order terminal from which the reservation was received.

2. A print order processing method as defined in claim 1, further comprising the step of displaying on the order terminal a list representing charges for the printed matter in accordance with various deadlines, wherein
    the step of receiving the reservation is the step of receiving the reservation of the deadline based on the displayed list.

3. The print order processing method according to claim 1, further comprising:
    displaying a page of deadlines available for reservation on the order terminal; and
    reserving a deadline by selecting at least one deadline from the displayed available deadlines.

4. The print order method according to claim 3, wherein the displaying the page of deadlines and reserving the deadline occur before sending the image data from the order terminal.

5. A print order processing method comprising the steps of receiving image data and order information representing the content of a print order regarding the image data sent from an order terminal that places the print order, selecting one of printing service providers that carries out printing processing on the image data according to the order information, and obtaining printed matter by causing printing processing means of the selected printing service provider to carry out the printing processing on the image data, the print order processing method further comprising the steps of:
    receiving from the order terminal a reservation of a deadline regarding the printed matter to be generated by the selected printing service provider; and
    sending information representing the reserved deadline, the order information, and the image data to the selected printing service provider via a network, with reference to the information representing the reserved deadline.

6. A print order processing method as defined in claim 5 further comprising the step of displaying on the order terminal a list representing charges for the printed matter in accordance with various deadlines, wherein
    the step of receiving the reservation is the step of receiving the reservation of the deadline based on the displayed list.

7. A print order processing method as defined in claim 6, wherein the list is generated for each of the printing service providers.

8. A print order prosessing method comprising the steps of controlling the printing processing means so as to complete the printing processing regarding the print order at the reserved deadline, based on the information representing the reserved deadline sent according to the print order processing method defined in any one of claims 5 to 7.

9. A computer-readable medium storing a computer program comprising the step of controlling the printing processing means so as to complete the printing processing regarding the print order at the reserved deadline, based on the information representing the reserved deadline sent according to the print order processing method defined in any one of claims 5 to 7.

10. A print order processing apparatus for obtaining printed matter by receiving image data and order information representing the content of a print order regarding the image data sent from an order terminal that places the print order, and then by carrying out printing processing on the image data by using printing processing means according to the order information, the print order processing apparatus comprising:
    reception means for receiving a reservation of a deadline regarding the printed matter from the order terminal; and
    control means for controlling the printing processing means so as to complete the printing processing at the reserved deadline, regarding the print order placed by the order terminal from which the reservation was received.

11. A print order processing apparatus as defined in claim 10, further comprising storage means for storing a list representing charges for the printed matter in accordance with various deadlines, wherein
    the reception means displays the list on the order terminal and receives the reservation of the deadline based on the list.

12. A print order processing apparatus for obtaining printed matter according to the steps of receiving image data and order information representing the content of a print order regarding the image data sent from an order terminal that places the print order, selecting one of printing service providers that carries out printing processing on the image data according to the order information, and causing printing processing means of the selected printing service provider to carry out the printing processing on the image data, the print order processing apparatus comprising:

reception means for receiving from the order terminal a reservation of a deadline regarding the printed matter to be generated at the selected printing service provider; and transmission means for sending information representing the reserved deadline, the order information, and the image data to the selected printing service provider via a network, with reference to the information representing the reserved deadline.

13. A print order processing apparatus as defined in claim 12, further comprising storage means for storing a list representing charges for the printed matter in accordance with various deadlines, wherein the reception means displays the list on the order terminal and receives the reservation of the deadline based on the list.

14. A print order processing apparatus as defined in claim 13, wherein the list is generated and stored in the storage means, for each of the printing service providers.

15. A print order processing apparatus comprising control means for controlling the printing processing means so as to complete the printing processing at the reserved deadline regarding the print order placed by the order terminal, based on the information representing the reserved deadline sent by the print order processing apparatus defined in any one of claims 12 to 14.

16. A computer-readable medium storing a computer program that causes a computer to execute a print order processing method comprising the steps of receiving image data and order information representing the content of a print order regarding the image data sent from an order terminal that places the print order, and obtaining printed matter by carrying out printing processing on the image data by using printing processing means according to the order information, the program comprising the steps of:

receiving a reservation of a deadline regarding the printed matter from the order terminal; and controlling the printing processing means so as to complete the printing processing at the reserved deadline, regarding the print order placed by the order terminal from which the reservation was received.

17. A computer-readable medium as defined in claim 16, the program further comprising the step of displaying on the order terminal a list representing charges for the printed matter in accordance with various deadlines, wherein the step of receiving the reservation is the step of receiving the reservation of the deadline based on the displayed list.

18. A computer-readable medium storing a computer program that causes a computer to execute a print order processing method comprising the steps of receiving image data and order information representing the content of a print order regarding the image data sent from an order terminal that places the print order, selecting one of printing service providers that carries out printing processing on the image data according to the order information, and obtaining printed matter by causing printing processing means of the selected printing service provider to carry out the printing processing on the image data, the program comprising the steps of:

receiving from the order terminal a reservation of a deadline regarding the printed matter to be generated by the selected printing service provider; and sending information representing the reserved deadline, the order information, and the image data to the selected printing service provider via a network, with reference to the information representing the reserved deadline.

19. A computer-readable medium as defined in claim 18, the program further comprising the step of displaying on the order terminal a list representing charges for the printed matter in accordance with various deadlines, wherein the step of receiving the reservation is the step of receiving the reservation of the deadline based on the displayed list.

20. A computer-readable medium as defined in claim 18, wherein the list is generated for each of the printing service providers.

* * * * *